United States Patent
Jonsson

(10) Patent No.: US 6,463,276 B1
(45) Date of Patent: *Oct. 8, 2002

(54) MOBILE TERMINAL HAVING CONDITIONAL BLOCKING OF OUTGOING CALL REQUESTS

(75) Inventor: Björn Erik Rutger Jonsson, Järfälla (SE)

(73) Assignee: Telefonaktiebolaget L M Ericsson (publ), Stockholm (SE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/985,538

(22) Filed: Dec. 5, 1997

(51) Int. Cl.[7] .................................. H04Q 7/20
(52) U.S. Cl. ............... 455/410; 455/411; 455/418; 455/565
(58) Field of Search ................ 455/565, 410, 455/411, 418; 379/200, 199, 189, 356, 359

(56) References Cited

U.S. PATENT DOCUMENTS

| | | | |
|---|---|---|---|
| 4,885,762 A | * 12/1989 | Suzuki et al. | ............... 455/411 |
| 5,345,595 A | 9/1994 | Johnson et al. | |
| 5,487,108 A | * 1/1996 | Atkins et al. | ............... 455/411 |
| 5,566,234 A | 10/1996 | Reed et al. | |
| 5,627,886 A | 5/1997 | Bowman | |
| 5,983,093 A | * 11/1999 | Haimi-Cohen | ............... 455/411 |

FOREIGN PATENT DOCUMENTS

| | | |
|---|---|---|
| EP | 0 786 913 A2 | 7/1997 |
| GB | 2 304 001 A | 3/1997 |
| WO | WO 97/04602 | 2/1997 |
| WO | PCT/SE/98/02199 | 4/1999 |

* cited by examiner

*Primary Examiner*—Lee Nguyen
(74) *Attorney, Agent, or Firm*—Jenkens & Gilchrist, P.C.

(57) ABSTRACT

A method and apparatus for preventing the fraudulent access of a mobile terminal is disclosed. The mobile terminal includes a user profile defining particular behaviors which are allowed by the mobile station in response to the initiation of certain types of calls. Control logic associated with the user profile determines, in response to the initiation of a telephone call, if the behavior required by the requested telephone call would comprise an allowed behavior as defined by the user profile. The control logic then grants or denies continuation of the call based upon this comparison.

14 Claims, 3 Drawing Sheets

MOBILE TERMINAL HAVING CONDITIONAL BLOCKING OF OUTGOING CALL REQUESTS

BACKGROUND OF THE INVENTION

1. Technical Field of the Invention

The present invention relates to the protection of mobile terminals from fraudulent use, and more particularly, to a system for monitoring defined behaviors of a user of a mobile terminal as a means for controlling access to the mobile terminal.

2. Description of Related Art

The protection of mobile terminals from fraudulent use by unauthorized third parties has become a major problem as the use of mobile telecommunication systems has become increasingly popular. The small size of a mobile terminal makes it easy to be inadvertently left somewhere by a user such that it can be picked-up and used by an unauthorized third party or for an unauthorized third party to steal the mobile terminal from a user's pocket, purse, car, etc.

Once the mobile terminal is possessed by an unauthorized third party, the third party may utilize the mobile terminal to access other telephone numbers at will. In order to combat this problem, various techniques have been developed. One method involves the use of an input code or password. This alternative, while protecting a mobile terminal from initial access by an unauthorized third party, does not protect against the situation when a mobile terminal has already been actuated, and the password entered such that call can be made until the mobile terminal is turned off or battery power limitations prevent further use. Variations of this solution have involved the entry of verbal passwords which must be processed by speech recognition circuitry and compared with a prestored speech pattern. This solution while effective is rather complex and expensive to implement.

Additional implementations involve the gathering or transmission of information to/from the mobile station from/to a network that the mobile station is accessing. These solutions while effective over a period of time do not prevent initial contacts by an unauthorized third party since the network based protections do not become effective until the unauthorized user accesses the network and carries out unauthorized call activity which the network may then detect. Thus, some means for enabling protection of a mobile terminal that is not dependent upon network functionalities and is not limited to providing protection only during an initial start-up and accessing procedure of the mobile terminal would greatly increase the protections available to authorize mobile terminal users.

SUMMARY OF THE INVENTION

The present invention overcomes the foregoing and other problems with a method and apparatus associated with a mobile terminal for preventing fraudulent access of the mobile terminal by unauthorized third parties. A user enters a telephone number to initiate a call through a user interface associated with the mobile terminal. Control circuitry within the mobile terminal receives the requested call connection and compares the behavior which would be implemented due to the provided telephone number with an allowed behavior defined within a user profile data set stored within the mobile terminal. If the implemented behavior corresponds to allowed behavior defined by the user profile, the control means completes initiation of the requested call. If the behavior would not correspond with a defined behavior, the user providing the entered telephone number is requested to enter an access code before call completion may take place.

The allowed behavior defined within the user profile of the mobile terminal may take several forms. In a first embodiment, the allowed behavior comprises a list of telephone numbers which the user may access. In another embodiment, the allowed behavior comprises a list of the most recently called telephone numbers, and finally, in yet another embodiment, the allowed behavior comprises a rule or rules defining the number of calls which may be initiated from the mobile terminal during any particular time period or another selected behavior. The user profile also preferably includes means for enabling the user to modify the allowed behavior defined within the user profile. This may be done through a variety of methods and is enabled once a user has entered a proper access code.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
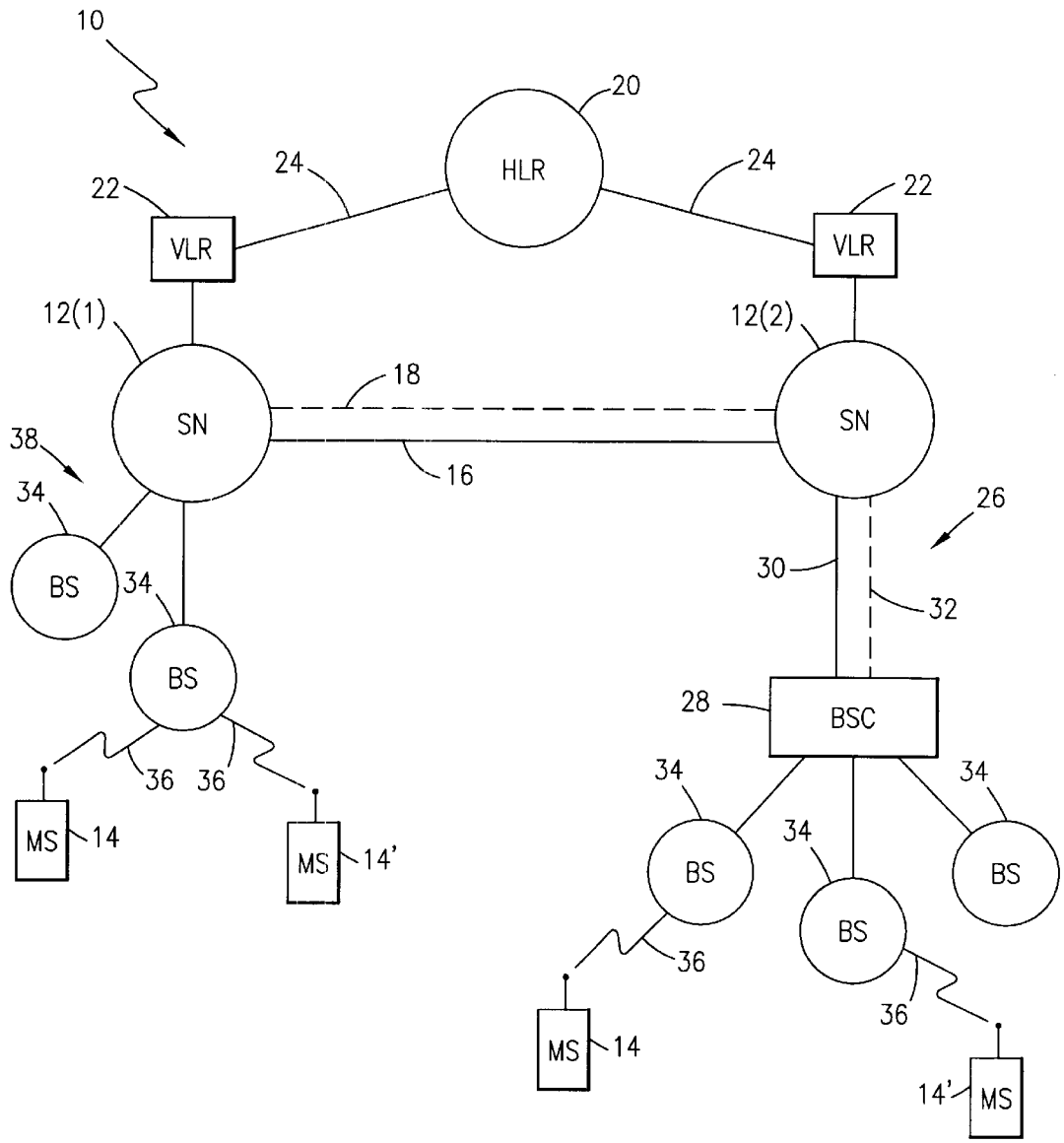
FIG. 1 is a schematic diagram of a cellular telephone network in which the present invention may be implemented.

Reference is now made to FIG. 1 wherein there is shown a schematic diagram of a wireless telephone network 10 providing wireless (cellular) telephone service within a given service area. The network 10 includes a plurality of interconnected switching nodes (SNs) 12 (also referred to as mobile switching centers—MSCs). Although only two switching nodes 12 are shown, it will be understood that the network 10 likely includes many more interconnected nodes. The first and second switching nodes 12(1) and 12(2) may comprise any one of a number of known telecommunications switching devices, including those commonly used and known in the art for providing either digital or analog cellular telephone service to a plurality of mobile stations (MS) 14. The switching nodes 12 are interconnected with each other for communication via both voice trunks 18 (illustrated with broken lines) and signaling links 16 (illustrated with solid lines) providing a known ISUP (or R1 or R2) type connection. The voice trunks 18 provide voice and data communications paths used to carry subscriber communications between the switching nodes 12. The signaling links 16 carry command signals between the switching nodes 12. These signals may be used, for example, in setting up and tearing down voice and data communications links over the voice trunks 18 and controlling the provision of calling services to the mobile stations 14.

Each switching node 12 is also connected to a home location register (HLR) 20 through an associated visitor location register (VLR) 22 by means of a signaling link 24 providing a known Mobile Application Part (MAP) or IS-41 type connection. The switching node and visitor location register may be co-located as a combined MSC/VLR. The home location register 20 stores information relating to the mobile stations 14 and their subscriptions comprising location information and service profile information. This information is stored by the home location register 20 in association with the subscriber (directory) number (SNB) and mobile identification number (MIN) for the mobile station 14. The home location register 20 further supports a plurality of temporary subscriber (directory) numbers (TSNBs) which are assigned and allocated on an as needed and temporary basis to established (defined and connected) roaming mobile stations 14' (i.e., roamers).

In one cellular telephone network implementation, illustrated generally at 26, the switching node 12 is further connected to at least one associated base station controller (BSC) 28 via both a signaling link 30 and a voice trunk 32. Only one base station controller 28 is shown connected to switching node 12(2) in order to simplify the illustration. The voice trunk 32 provides a voice and data communications path used to carry subscriber communications between the second switching node 12(2) and its base station controller 28. The signaling link 30 carries command signals between the node 12 and its associated base station controller 28. The signaling link 30 and trunk 32 are collectively commonly referred to in the art as the "A interface". The base station controller 28 is then connected to a plurality of base stations (BS) 34 which operate to effectuate radio frequency communications with proximately located mobile stations 14 over an air interface 36. The base station controller 28 functions in a well known manner to control this radio frequency communications operation.

In another cellular telephone network implementation, illustrated generally at 38, the switching node 12(1) is further connected to a plurality of base stations (BS) 34 which operate to effectuate radio frequency communications with proximately located mobile stations 14 over the air interface 36. In this implementation, the functionality provided by the base station controller 28 (see, generally at 26) is instead provided by the switching node 12.

Although direct communications links (signaling and/or trunk) between the nodes are illustrated in FIG. 1, it is understood by those skilled in the art that the links are not necessarily direct between the illustrated nodes, and may instead pass through many other communications nodes (not shown) of the mobile network, and perhaps even utilize other communications networks (such as the public switched telephone network—PSTN). Illustration of the links in a "virtual" manner as shown in FIG. 1 is therefore by way of simplification of the drawing and the communications relationship between the various included nodes within the network 10.

Figure 2:
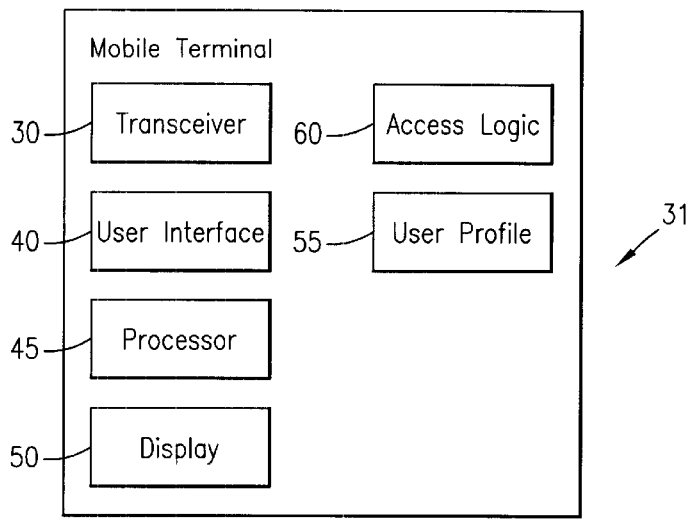
FIG. 2 is a functional block diagram of a mobile terminal implementing the user profile of the present invention.

Referring now to FIG. 2, there is illustrated a functional block diagram of a mobile terminal (mobile station) 31 incorporating the present invention. The mobile terminal 31 includes a transceiver 35 for transmitting and receiving cellular communication signals from the mobile terminal 31 to a base station with which the mobile terminal is currently in communication. A user interface 40 enables a user authorized to enter call request information such as a telephone number and a send command. In the preferred embodiment, the user interface 40 consists of a standard cellular telephone keypad. A processor 45 controls processing functionalities within the mobile terminal 31. A display 50 provides a visual representation of information that the user of the mobile terminal 31 may need to know. Alternatively, the display 50 may also include some type of audio display means, such as a speaker for presenting an audio representation of information to a user.

The user profile 55 and access logic 60 comprise the heart of the present invention for controlling the user's access to the mobile terminal 31 based upon the behavior of The user's calling action. The user profile 55 defines a number of behaviors which are allowable in response to a particular call request. These behaviors may include, for example, particular numbers that may be called or the number of calls which may be made during a set time period. The access logic 60 may comprise either a hardware or software implementation and controls the granting of a call request to a provided telephone number based upon the allowed behavior defined within the user profile 55.

The access logic 60 may also include means associated with the user profile 55 to allow a user to dynamically modify the allowed behaviors enabled by the user profile 55. Thus, a user may alter the profile based upon the particular circumstances in which they find themselves. For example, a user may use a certain profile when carrying the terminal in public places, and another profile when visiting business contacts or working in the office. Modification of the user profile 55 may be carried out in a variety of manners, such as, loading a new software module stored within a random access memory (e.g., on the SIM-Card) or by connecting the mobile terminal to a server on a computer and downloading the software whereby the particular characteristics of a profile may be set in advance. The user profile 55 may also be altered in response to a selected code entered into the mobile terminal by way of a call to the mobile terminal from a remote location. The selected code once entered will cause the user profile 55 to block all outgoing calls or require the entry of a user code to complete a call.

Additionally, the modification of the profile 55 will enable the mobile user to define the particular actions which may result from a fraud detection. For example, the user may cause the fraudulent user to be requested to enter an access code (pin number), immediately block access to the terminal, provide a voice message informing the user of limited communications access to the terminal or enable the user to only send an SMS message.

Figures 3, 5, 7:
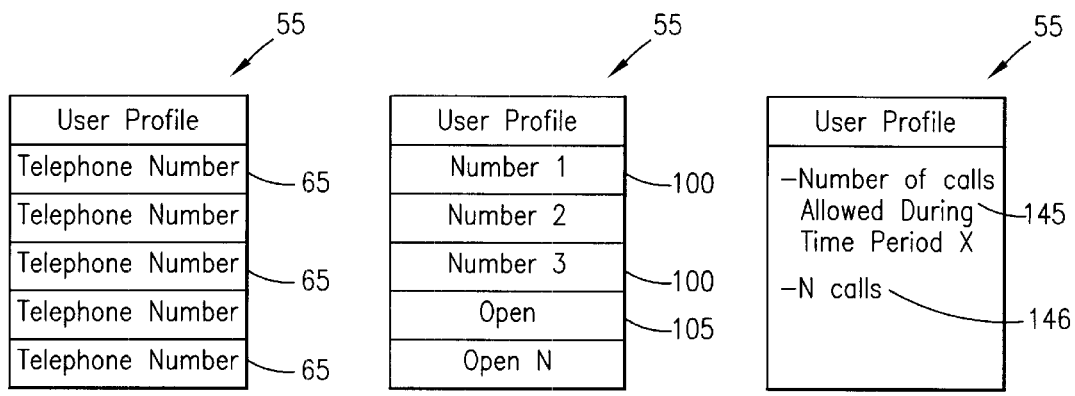
FIG. 3 is an illustration of a first embodiment of a user profile.
FIG. 5 is an illustration of another embodiment of the user profile.
FIG. 7 is an illustration of yet another embodiment of the user profile.

Referring now to FIG. 3, there is illustrated a first embodiment of the user profile 55, wherein the defined allowed behavior consists of a number of predefined telephone numbers 65 which the mobile terminal 31 is allowed to access via a wireless communications link. The telephone numbers 65 are preselected by the user and comprise the only numbers which the user may access without the entry of some type of access code. The number of predefined telephone numbers 65 may also consist of a group of telephone numbers selected from a telephone book number list stored within the mobile terminal. In this case, the user would merely select a desired number of entries from the prestored telephone book to generate the predefined telephone numbers 65.

Figure 4:
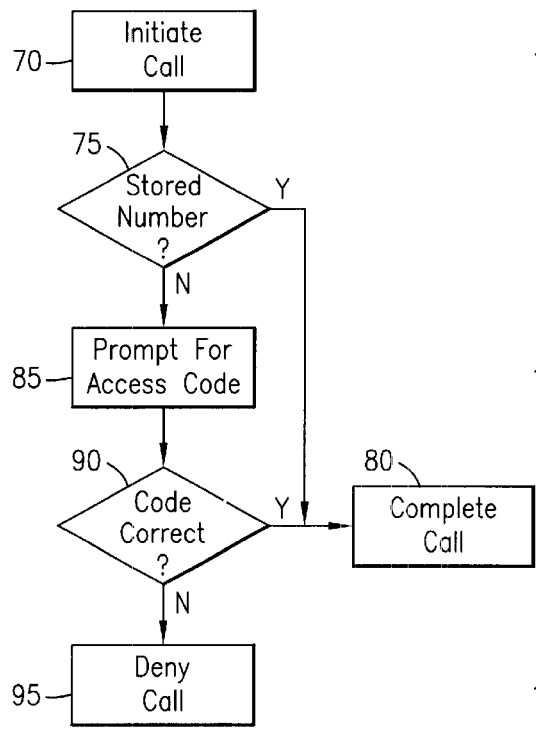
FIG. 4 is a flow diagram describing the operation of a call connection according to the user profile of FIG. 3.

Referring now also to FIG. 4, there is a flow diagram illustrating a call initiation implementing the user profile of FIG. 3. A call is initiated at step 70 and inquiry step 75 determines whether the telephone number entered by the user comprises a valid user destination telephone number 65 defined within the user profile 55. If so, the call is completed to the entered destination telephone number. If the destination telephone number is not a telephone number 65 defined within the user profile 55, the user is prompted at step 85 for the entry of an access code, such as a pin number or any other known method for authentication, to enable continuation of the call connection. Inquiry step 90 determines if the correct access code was entered by the user, and if so, the call is completed at step 80. If no code or the incorrect code is entered, call completion to the destination telephone number is denied at step 95.

Referring now to FIG. 5, there is illustrated another embodiment of the user profile 55 wherein the profile stores a number of telephone numbers 100 representing the last (n) calls initiated from the mobile terminal 31 and for which no answer has been obtained. Thus, a user is only able to contact one of the previously called (n) numbers unless an access code is entered. If the profile 55 is not completely filled with previously called telephone numbers, storage locations 105 will be open and able to receive the next outgoing call initiated by the mobile terminal.

Figure 6:
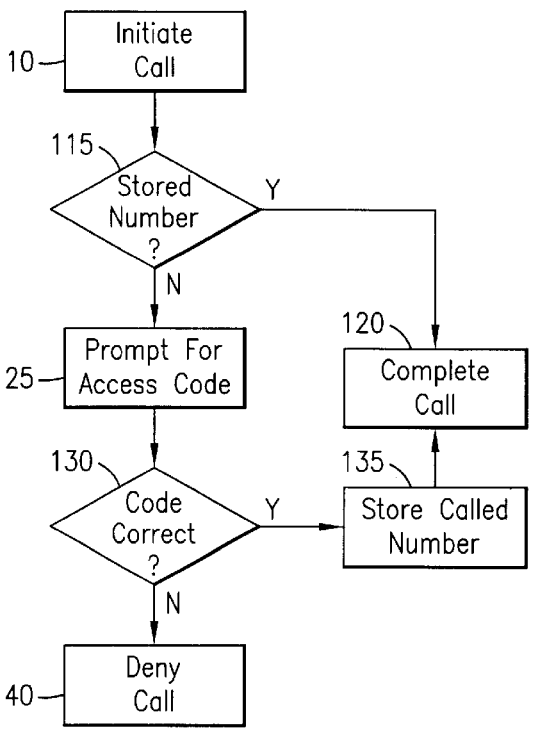
FIG. 6 is a flow diagram describing the operation of a call connection according to the user profile of FIG. 5.

Referring now to FIG. 6, there is illustrated a flow diagram describing the method for providing a call connection using the user profile illustrated in FIG. 5. After the initiation of a call at step 110, inquiry step 115 determines if the destination telephone number comprises one of the telephone numbers previously called by the mobile terminal 31 stored within the user profile 55. If so, the call is completed to the destination telephone number at step 120. If the destination telephone number is not presently stored within the user profile 55, the user is prompted at step 125 to enter an access code before the call may be completed. Inquiry step 130 determines if a proper access code has been entered and if so, enters the destination telephone number into the user profile 55 at step 135 and completes the call to the number at step 120. If an incorrect or no code is entered, the call connection is denied at step 140.

Referring now to FIG. 7, there is illustrated yet another embodiment of the user profile wherein the defined behavior of the user profile 55 comprises a rule 145 defining the number of calls which may be made during a selected time period X. The user profile 55 would also include an indicator 146 for tracking the number of calls made during time period X. Alternatively, it should be realized that the rule may define any desired behavior or method of call processing.

Figure 8:
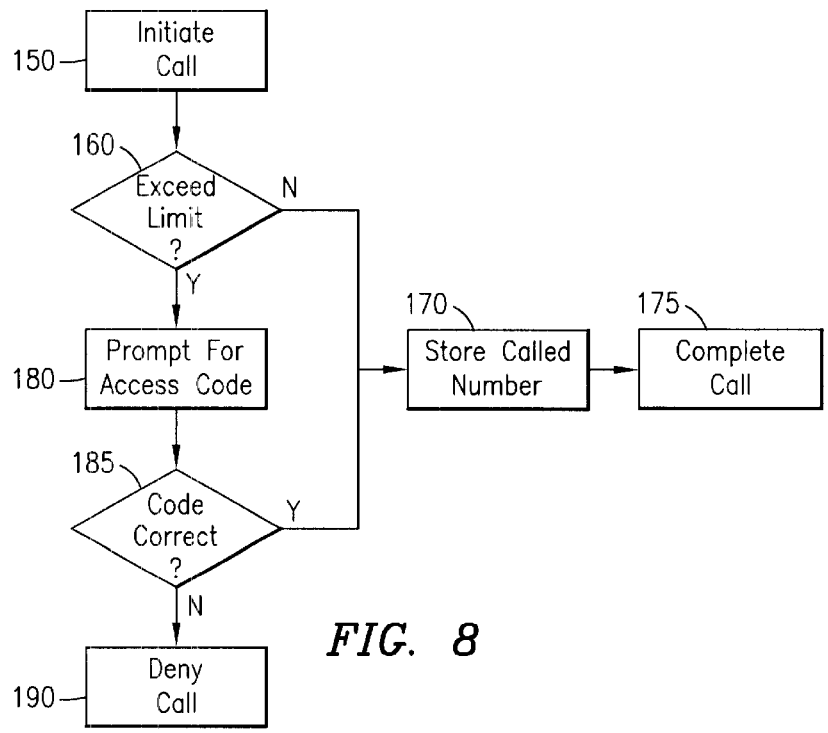
FIG. 8 is a flow diagram describing the operation of a call connection according to the user profile of FIG. 7.

FIG. 8 illustrates a flow diagram of a call connection process according to the user profile of FIG. 7. After call initiation at step 150, inquiry step 160 accesses the indicator 146 to determine if the number of calls has exceeded the predetermined limit during the selected time period. If not, control passes to step 170 wherein the indicator 146 is incremented according to the additional call, and the call is completed at step 175. If the number of calls has been exceeded for the selected time period, the user of the mobile terminal 31 is prompted for an access code at step 180, and inquiry step 185 determines the accuracy of the provided access code. If the code is correct, the indicator of the number of calls is incremented at step 170, and the call is completed at step 175. Upon failure to enter a code or entry of an incorrect code, the call is denied at step 190.

Although preferred embodiments of the method and apparatus of the present invention have been illustrated in the accompanying Drawings and described in the foregoing Detailed Description, it is understood that the invention is not limited to the embodiments disclosed, but is capable of numerous rearrangements, modifications, and substitutions without departing from the spirit of the invention as set forth and defined by the following claims.

What is claimed is:

1. A mobile station capable of calling any telephone number, comprising;
    a ten digit user interface for receiving input to initiate a call to any entered telephone number;
    a first user profile defining allowed behavior for the mobile station at a first physical location and a second user profile defining allowed behavior for the mobile station at a second physical location, wherein the first or second user profile is selected responsive to a user provided input;
    a predefined action profile within the mobile terminal containing a user definable required action;
    a controller for determining if initiation of the call to the entered telephone number comprises an allowed behavior by the mobile station, for initiating the call if initiation of the call conforms to the allowed behavior and for accessing the predefined action profile to determine the required action if the request for the call connection is not in accordance with the allowed behavior defined by the predefined user first and second profile.

2. The mobile station of claim 1 wherein the allowed behavior comprises a list of predefined telephone numbers which may be called without entering an access code.

3. The mobile station of claim 2 wherein the first and second user profile further includes means for enabling modification of the list of predefined telephone numbers upon entry of an access code.

4. The mobile station of claim 1 wherein the allowed behavior comprises a list of most recently called telephone numbers which may be called without entering an access code.

5. The mobile station of claim 4 wherein the first and second user profile further includes means for storing the entered telephone number in the list of most recently called telephone numbers.

6. The mobile station of claim 1 wherein the controller further requests entry of an access code if the initiation of the call to the entered telephone number does not comprise allowed behavior and for determining a validity of an entered access code.

7. The mobile system of claim 1 further including means for altering the allowed behavior of the user profile.

8. A mobile station, comprising:
    a user interface for receiving input to initiate a call to an entered telephone number;
    a first user profile defining allowed behavior for the mobile station at a first physical location and a second user profile defining allowed behavior for the mobile station at a second physical location, wherein the first or second user profile is selected responsive to a user provided input;
    a controller for determining if initiation of the call to the entered telephone number comprises an allowed behavior by the mobile station for initiating the call if initiation of the call conforms to the allowed behavior and for accessing a predefined action profile within the mobile terminal to determine a required action if the request for call connection is not in accordance with the allowed behavior defined by the predefined user profile;

means for altering the allowed behavior of the user profile; and wherein the controller further requests entry of an access code if the initiation of the call to the entered telephone number does not comprise allowed behavior and for determining a validity of an entered access code.

9. The mobile station of claim 8 wherein the allowed behavior comprises a list of predefined telephone numbers.

10. The mobile station of claim 8 wherein the allowed behavior comprises a list of most recently called telephone numbers.

11. The mobile station of claim 10 wherein the user profile further includes means for storing the entered telephone number.

12. A mobile station, comprising;
- a ten digit user interface for receiving input to initiate a call;
- a first user profile defining allowed behavior for the mobile station at a first physical location and a second user profile defining allowed behavior for the mobile station at a second physical location, wherein the first or second user profile is selected responsive to a user provided input;
- a controller for determining if initiation of the call to the entered telephone number comprises an allowed behavior by the mobile station, for initiating the call if initiation of the call conforms to the allowed behavior.

13. A method for automatic control of a mobile terminal, comprising the steps of:
- receiving a request for communications access from a user of the mobile terminal;
- accessing a predefined user profile containing a first user profile defining allowed behavior for the mobile station at a first physical location and a second user profile defining allowed behavior for the mobile station at a second physical location located at the mobile terminal to determine a type of the request for communication access;
- accessing a predefined action profile located at the mobile terminal to determine an automatic terminal control action corresponding with the type of requested communication access, wherein said automatic terminal control action does not comprise blocking the requests for communications access until a identifier is received; and
- granting communications access according to the automatic terminal control action.

14. The method of claim 13, further including the steps of:
connecting to a predefined node; and
downloading from said predefined node, the user profile and the action profile.

* * * * *